United States Patent [19]
Basham

[11] 3,980,112
[45] Sept. 14, 1976

[54] CONDUIT ASSEMBLY FOR CONVEYING VOLATILE FLUIDS

[75] Inventor: Robert L. Basham, Dayton, Ohio

[73] Assignee: Dayco Corporation, Dayton, Ohio

[22] Filed: Mar. 21, 1975

[21] Appl. No.: 560,752

[52] U.S. Cl. ............................ 141/392; 285/133 R
[51] Int. Cl.[2] .................... B65B 3/18; F16L 47/00
[58] Field of Search ............ 141/59, 285, 290, 291, 141/311, 392; 285/133 R, 133 A, 47; 222/400.7

[56] References Cited
UNITED STATES PATENTS

1,862,260  6/1932  Edmunds ...................... 285/133 A
2,838,074  6/1958  Lauck .......................... 285/133 R Primary Examiner—Richard E. Aegerter
Assistant Examiner—Frederick R. Schmidt
Attorney, Agent, or Firm—Reuben Wolk

[57] ABSTRACT

A conduit assembly having fluid passages therein for conveying a volatile liquid in one direction to a container and returning vapors of the volatile liquid from the container on a direction opposite the one direction wherein the assembly comprises a flexible inner and outer conduit provided with special couplings at opposite ends thereof.

22 Claims, 11 Drawing Figures

CONDUIT ASSEMBLY FOR CONVEYING VOLATILE FLUIDS

BACKGROUND OF THE INVENTION

Air pollution is one of the major problems confronting our nation and indeed the entire world, whereby it is important that air pollution be prevented or minimized wherever possible and this is particularly true in the transfer of volatile fluids from one container to another.

In addition, with energy producing liquids, such as gasoline, for example, in short supply it is important that every effort be made to minimize losses and considerable efforts have been made to capture the vapors of such volatile liquids during the transfer of the volatile liquids from one container to another. In particular, it has been found that substantial gasoline savings can be achieved by capturing gasoline vapors expelled from the receiving tank in the process of transferring gasoline from a refinery storage tank to a mobile transport tank, from a mobile transport tank to an underground storage tank, and from an underground storage tank to a tank of a motor operated vehicle such as an automobile, truck, bus, boat, or the like.

For enviromental as well as energy conserving reasons, efforts have been made heretofore in connection with gasoline servicing systems to use one conduit system to transfer the liquid gasoline to a receiving container while employing a separate conduit system to capture the vapors expelled from the receiving tank. However, such multiple conduit systems are cumbersome, complicated, and expensive.

SUMMARY

This invention provides a simple, economical, and easily installed conduit assembly which is readily adaptable to currently used containers, tanks, dispensing nozzles, coupling devices, and related components which enables transfer of a volatile liquid in one direction to a container and the return of vapors of the volatile liquid from the container to minimize or eliminate air pollution as well as enable recovery of such vapors.

The conduit assembly comprises a flexible inner conduit defining an inner fluid passage, a flexible outer condiut disposed around the inner conduit with the conduits being relatively sized to define an outer fluid passage between the conduits and a coupling having means fixing one end portion of the outer conduit thereto in sealed relation. The conduit assembly includes a fitting fixed to and received within one end portion of the inner conduit and means holding the fitting and the associated end portion of the inner conduit in the coupling concentrically within the outer conduit to define a continuation of the outer passage between the fitting and coupling while preventing axial movement of the fitting relative to the coupling. The coupling is adapted to be detachably fastened to a coupling adapter which has a first means therein adapted to communicate only with the inner passage and has second means therein adapted to communicate only with the outer means therein adapted to communicate only with the outer passage.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which.

DESCRIPTION OF ILLUSTRATED EMBODIMENTS

Figure 1:
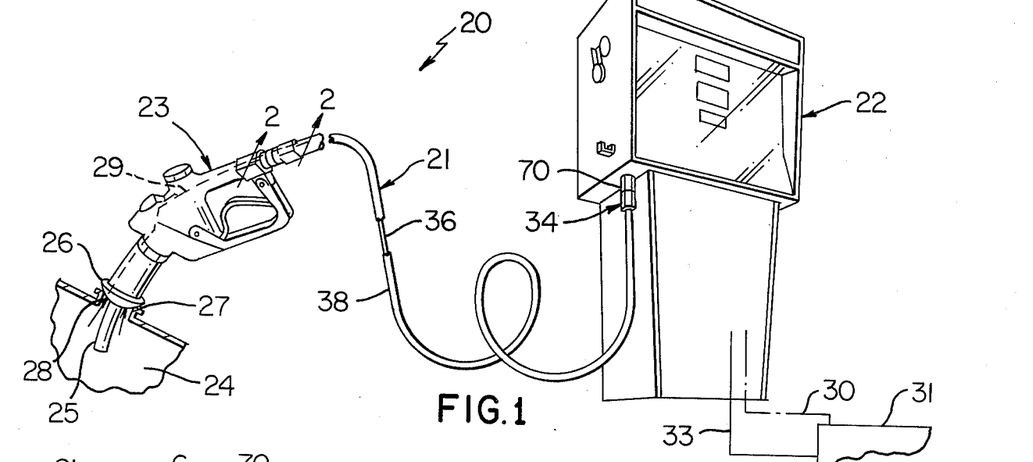
FIG. 1 is a primarily perspective view with parts in cross section, parts broken away, and parts shown diagrammatically particularly illustrating one exemplary embodiment of a conduit assembly of this invention utilized between a gasoline metering pump of the type utilized at a gasoline service station and a typical handheld gasoline dispensing nozzle showing such nozzle inserted within the filler neck of a tank.

Reference is now made to FIG. 1 of the drawings which illustrates one exemplary embodiment of fluid transfer system of this invention which is designated generally by the reference numeral 20 and is particularly adapted to transfer volatile fluids such as gasoline and the system 20 utilizes one exemplary embodiment of the conduit assembly of this invention which is designated generally by the reference numeral 21. The exemplary conduit assembly 21 is shown utilized on a gasoline service station and serves to transfer gasoline from the pump 22 through the usual trigger-type nozzle 23 to a container or tank 24 of a motor vehicle such as an automobile (not shown).

The nozzle 23 has a central gasoline conveying tube 25 and a seal and vapor entrance device 26. The tube 25 provides flow of gasoline to the tank 24 while the device 26 is adapted to be sealed in a fluid tight manner against an annular edge of a filler neck 27 for the tank 24 and the device has suitable gasoline vapor receiving openings 28 provided therethrough which communicate with a suitable passage 29 (shown schematically in the nozzle 23). The passage 29 communicates with the conduit assembly 21 as will be described later, and through a suitable pipe 30 which has one end portion in the metering pump 22 and its opposite end portion exiting into an underground storage tank 31 for receipt of gasoline vapors expelled from the tank 24 by gasoline received therein.

The tank 31 has a suitable conduit or pipe 33 which communicates with the usual gasoline metering mechanisms of the pump 22 whereupon the gasoline is conveyed to the inlet of the conduit assembly 21 at 34. Thus, gasoline flows through the conduit assembly in one direction, i.e., from the dispensing pump 22 to the tank 24, while gasoline vapors from the tank flow in an opposite direction to the underground tank 31.

Figure 2:
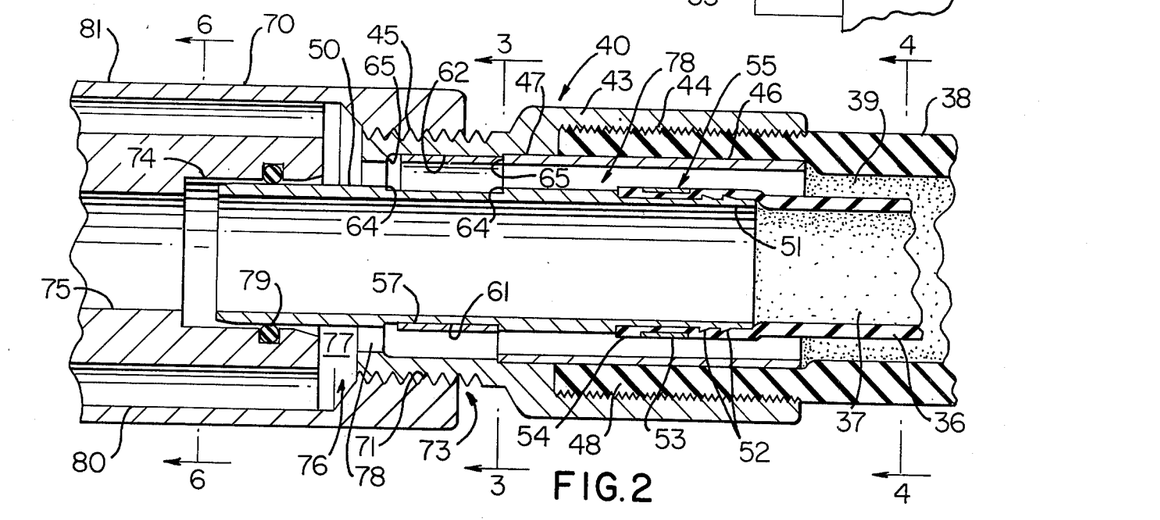
FIG. 2 is a view taken essentially on the line 2—2 of FIG. 1.

The conduit assembly 21 comprises a flexible inner conduit 36 which defines one of the fluid passages and in this example defines an inner one of the fluid passages which is designated by the reference numeral 37 and has a flexible outer conduit 38 disposed substantially concentrically around the inner conduit as will be readily apparent in FIG. 2. The conduits 36 and 38 are relatively sized to define an outer fluid passage 39 between the conduit 36 and 38, i.e., between the outside cylindrical surface of conduit 36 and the inside cylindrical surface of the conduit 38.

The conduit assembly 21 has a coupling which is designated generally by the reference numeral 40 in FIG. 2 and the coupling has a main outer housing 43 of tubular configuration which has integral serrations 44 defining an inside surface of one end portion thereof and integral male threads 45 along its opposite end portion. The coupling 40 also has a right circular cylindrical tubular portion 46 which is suitably fixed concentrically within the main outer housing 43 in a fluid-tight manner by welding, or the like, and as shown at 47. The outer conduit 38 has an end portion 48 which is installed in the coupling and gripped by the serrations 44, and a suitable sealing material in the form of a compound may be provided between the end portion 48 and the adjoining serrations 44 and/or tubular portion 46, if desired.

The coupling 40 also has a fitting 50 which is in the form of a tubular fitting and the fitting 50 has a stepped or reduced outside diameter end portion 51 provided with annular barb-like projections 52; and, the stepped portion 51 with its barb-like projections 52 are received within the inner conduit 36. A clamp device in the form of a so-called low profile clamp 53 is provided and used to fix the end portion 54 of the inner conduit 36 to the fitting 50 and the clamp 53 is such that once tightened, it has an outside diameter which is indicated at 55 which is approximately equal to the maximum outside diameter of the end portion 54 of the conduit 36 with the conduit 36 moved over the fitting 50.

The coupling 40 has means for holding the fitting 50 and hence the end portion 54 of the conduit 36 and indeed the conduit 36 in the coupling 40 concentrically within the outer conduit 38 and such holding means is in the form of a clip 57. The clip 57 has two main functions wherein one function is to hold the fitting 50 and hence end portion 54 of the conduit 36 concentrically within the outer conduit 38 and the other main function is to prevent axial movement of the fitting 50 relative to the coupling 40.

Figure 3:
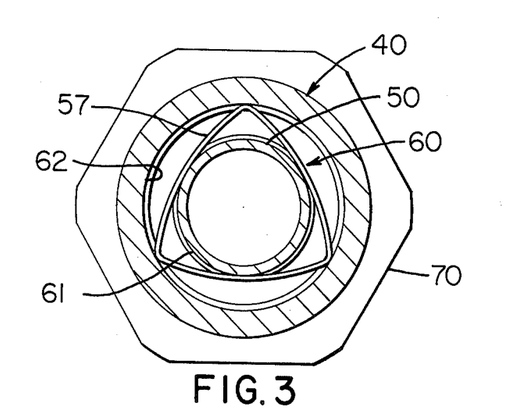
FIG. 3 is a view taken essentially on the line 3—3 of FIG. 2.

The clip 57 of this example is in the form of a resilient spring-like member which is bent in a substantially equilateral triangular configuration as illustrated at 60 in FIG. 3 and the clip 57 has portions thereof along the central parts of the triangular legs received within an annular recess 61 provided in the fitting 50 while the three apexes thereof are received within an annular recess 62 provided in the housing portion 43 of the coupling 40. Axial movement of the clip 57 and hence the fitting 50 and conduit 36 is prevented by opposed end edges of the clip 57 engaging annular edges 64 of the fitting 50 and annular edges 65 of the housing member 43.

The conduit assembly 21 is particularly adapted to be received within a cooperating coupling adapter and in this example the coupling adapter is designated generally by the reference numeral 70 and provided as an integral part of the trigger nozzle 23; however, it will be appreciated that the coupling adapter may be provided as an integral part of the assembly 21 and as will be explained in more detail later.

The coupling 40 is adapted to be detachably fastened to the adapter 70 and in this example the adapter 70 has female threads 71 therein which are adapted to receive cooperating male threads 45 provided in the reduced diameter portion of the housing member 43 comprising the coupling 40 and as shown at 73.

Figure 6:
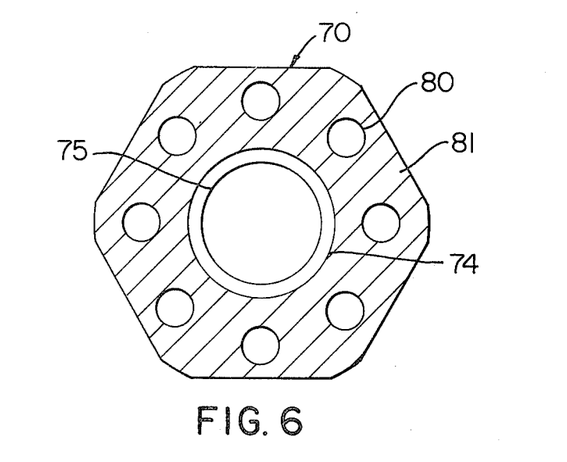
FIG. 6 is a view taken essentially on the line 6—6 of FIG. 2 showing a coupling adapter provided as a part of the gasoline dispensing nozzle of FIG. 1 and wherein the adapter receives an associated coupling therein and the adapter has a plurality of cylindrical gasoline vapor conveying openings therein.

The coupling adapter 70 has first means therein in the form of a counterbore 74 which is adjoined by a bore 75 and is particularly adapted to receive the fitting 50 therein whereby the bore 75 is particularly adapted to communicate only with the passage 37. Similarly, the adapter 70 has second means therein indicated generally at 76 which is particularly adapted to communicate only with the outer passage 39 and in this example the second means 76 is in the form of a chamber 77 which is in flow communication at one end with an extension 78 of the outer passage 39 defined between the fitting 50 and coupling 40; and, an O ring seal 79 is provided between the cylindrical surface defining counterbore 74 and fitting 50. The chamber 77 is in flow communication at its opposite end with a plurality of circumferentially arranged cylindrical openings 80 extending through a housing portion 81 of the adapter 70. It will be appreciated that gasoline vapors from the tank 24 flow through passage 29 in the nozzle 23, cylindrical openings 80 into the chamber 77, outer passage 39, and pipe 30 in the dispensing pump 22 to the underground gasoline storage tank 31.

Thus, it is seen that, in essence, the conduit assembly 21 enables a volatile liquid such as gasoline to be conveyed through passage 37 in one direction, i.e., from the pump 22 to an automobile tank 24 while returning vapors of the volatile liquid such as gasoline vapors from the tank 24 in the opposite direction through passage 39 to the service station metering pump 22 and then through pipe 30 to the underground storage tank 31.

The conduit assembly 21 is shown in FIG. 1 as being particularly adapted to be received within a cooperating coupling adapter 70 and the coupling adapter 70 is provided as an integral part of the nozzle 23. However, it will be appreciated that that the opposite end of the conduit assembly 21 also has a coupling 40 and such coupling 40 is adapted to be received within a coupling adapter also designated generally by the reference numeral 70 and provided as an integral part of the dispensing pump 22. To enable easy connection of the associated coupling 40 of assembly 21 thereto, the adapter 70 on the pump 22 has suitable passages therein which are substantially identical to the corresponding passages of the adapter 70 provided as an integral part of the nozzle 23 and such passages will not be described in detail; and, the adapter 70 on the dispensing pump 22 has an inner passage 37 communicating with pipe 33 from the tank 31 and an outer passage 39 communicating with pipe 33 to the underground storage tank 31.

Figure 7:
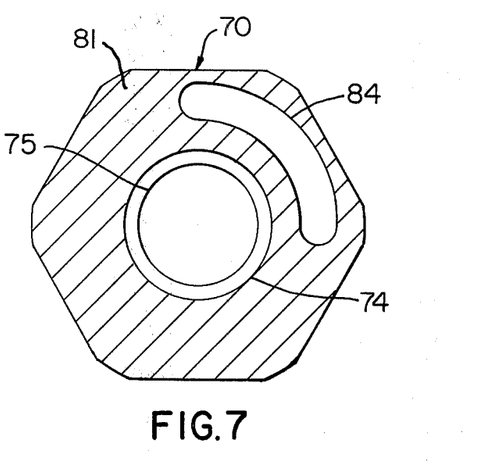
FIG. 7 is a view similar to FIG. 6 illustrating a modification of the gasoline dispensing nozzle which employs a single substantially kidney-shaped opening therethrough instead of the plurality of cylindrical openings.

It will also be appreciated that instead of having a plurality of cylindrical openings 80 and extending through its housing portion 81, the adapter 70 may have a single opening 84 extending through such housing portion 81 as illustrated in FIG. 7 and the single opening 84 may be in the form of a substantially kidney-shaped opening. The opening 84 has one end portion thereof in communication with the chamber 77 while its opposite end portion is in flow communication with the passage 29 in the nozzle 23.

The openings 80 or opening 84 through the housing portion 81 need not necessarily be cylindrical or kidney-shaped respectively but may be any desired configuration or any desired number or arrangement. The cylindrical openings 80 extend through the housing portion in parallel relation on a common circumference and radially spaced from the central bore 75; and, the kidney-shaped opening 84 of FIG. 7 extends parallel to the central bore 75 and in parallel relation thereto.

Figure 8:
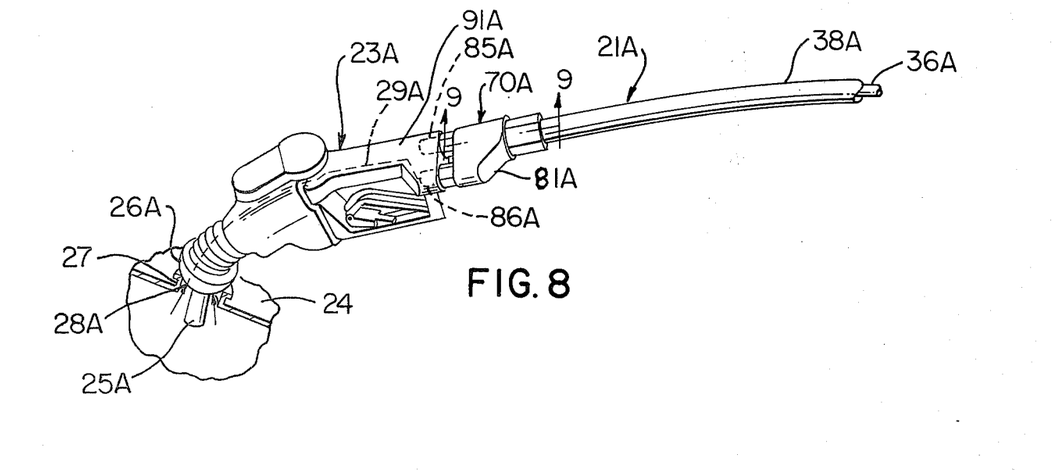
FIG. 8 is a view similar to the left hand portion of FIG. 1 illustrating a modified form of a conduit assembly which includes a special coupling adapter enabling the assembly to be utilized with a modified form of gasoline dispensing nozzle instead of the gasoline dispensing nozzle illustrated in FIG. 1.
Figures 9, 10, 11:
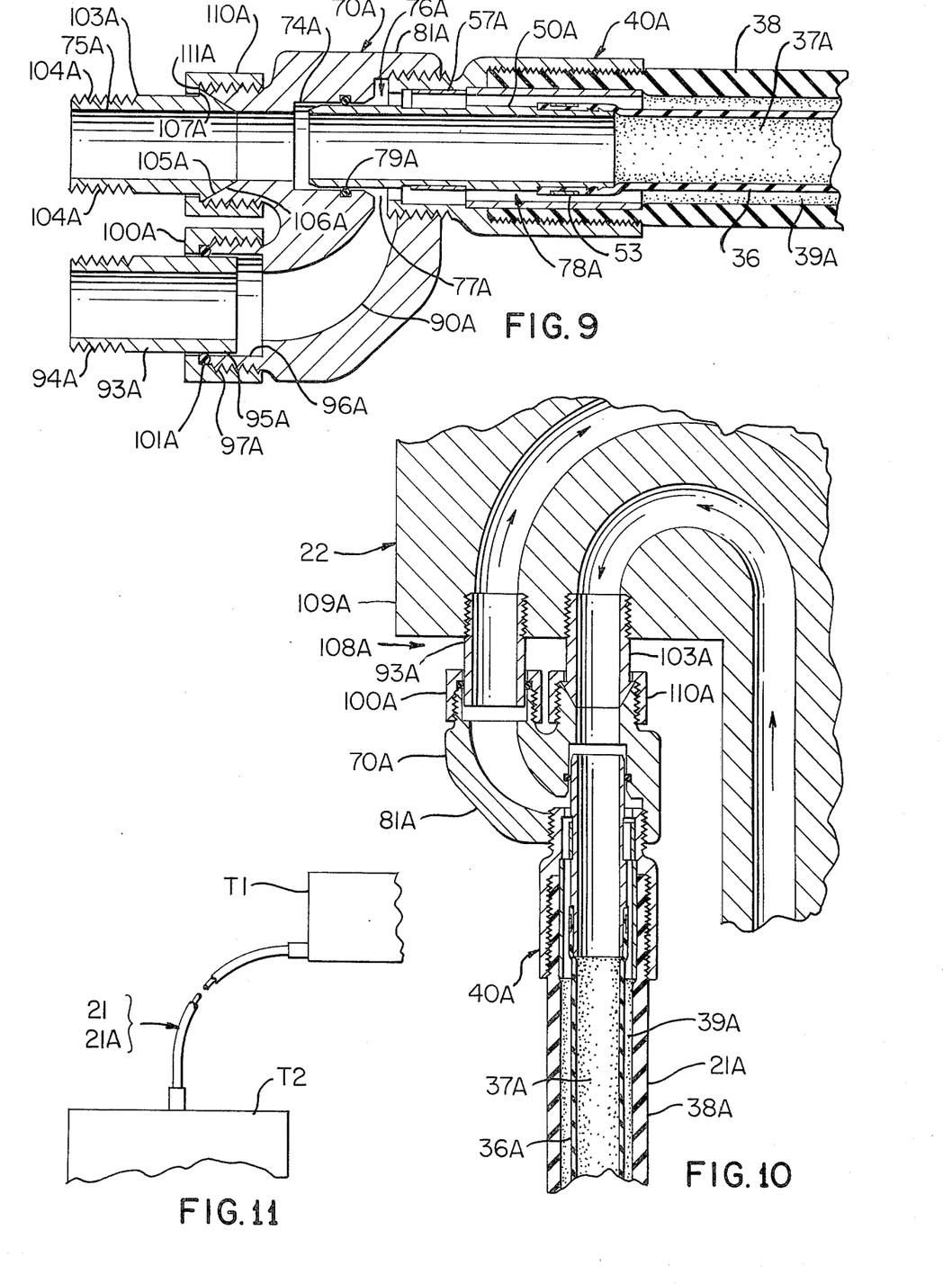
FIG. 9 is a view drawn to an enlarged scale and taken essentially on the line 9—9 of FIG. 8.
FIG. 10 is a cross-sectional view showing the opposite end portion of the conduit assembly of FIGS. 8 and 9 installed in position in the gasoline dispensing pump of FIG. 1.
FIG. 11 is a schematic presentation with parts broken away particularly illustrating the conduit assembly of this invention being used to transfer volatile fluids between a pair of tanks.

Another exemplary embodiment of the conduit assembly of this invention is illustrated in FIGS. 8–10 of the drawings. The conduit assembly of FIGS. 8–10 is very similar to the conduit assembly 21; therefore, such conduit assembly will be designated by the reference numeral 21A and representative parts of the conduit assembly which is similar to corresponding parts of the conduit assembly 21 will be designated in the drawings by the same reference numeral as in the conduit assembly 21 (whether or not such parts are mentioned in the specification) followed by the letter designation A and not described again in detail. Only those component parts of the conduit assembly 21A which are different from corresponding parts of the conduit assembly 21 will be designated by a new reference numeral also followed by the letter designation A and described in detail.

The conduit assembly 21A instead of having couplings at its opposite ends which are particularly adapted to be received within associated adapters has adapters 70A provided as a part of such conduit assembly 21A and the description will proceed with the adapter assembly with a gasoline nozzle 23A. The coupling adapter 70A is particularly adapted to be connected to the gasoline dispensing nozzle 23A and such nozzle has two internally threaded ports 85A and 86A for this purpose with the port 85A communicating with fluid passage 37A and defining the inlet to the gas conveying tube 25A of nozzle 23A and the port 86A defining the outlet of passage 29A and communicating with passage 39A.

The nozzle 23A also has a seal and vapor entrance device 26A arranged around its tube 25A. The tube 25A provides flow of gasoline to the tank 24 of an automobile while the device 26A is adapted to be sealed in a fluid tight manner against an annular edge of the filler neck 27 of the tank 24; and, the device 26A has suitable gasoline vapor receiving openings 28A provided therethrough which communicate with the vapor passage 29A shown schematically in the nozzle 23A.

As best seen in FIG. 9 of the drawings, the coupling adapter 70A has a main housing 81A and has first means therein in the form of a counterbore 74A which communicates with a bore 75A and is particularly adapted to receive the fitting 50A which extends beyond the forward end of the coupling 40A and in a similar manner as described in connection with the coupling 40 of the conduit assembly 21 whereby the bore 75A is particularly adapted to only receive flow from the passage 37A therethrough.

The adapter 70A has second means 76A therein which is particularly adapted to communicate with only the outer passage 39A of the conduit assembly 21A and in this example the second means 76A comprises a chamber 77A which is in flow communication at one end thereof with an extension 78A of the outer passage 39A defined between the fitting 50A and coupling 40A. The chamber 77A is in flow communication at its opposite (inlet end in this example) with a curved passage 90A provided in the housing 81A. Thus, it will be appreciated that gasoline vapors from the tank 24 flow through the passage 29A in the nozzle 23A, passage 90A, chamber 77A, passage 39A, and pipe 30 in the dispensing pump 22 to the underground storage tank 31 upon connecting the conduit assembly 21A to the dispensing pump 22 in a similar manner as illustrated in FIG. 1 for the conduit assembly 21.

Thus, the conduit assembly 21A enables gasoline to be conveyed through passage 37A in one direction from the dispensing pump 22 to an automobile tank 24 while returning gasoline vapors from the tank 24 in an opposite direction through passage 39A to the underground storage tank 31.

The gasoline dispensing nozzle 23A shown in FIG. 8 is of a type which is currently available and has a main outer housing portion 91A which has the threaded ports 85A and 86A defined as female threaded ports and such ports define openings which are arranged in parallel relation with one of such openings defining the inlet to tube 25A and the outer opening defining the outlet of passage 29A.

The threaded port 86A is particularly adapted to received a threaded fitting 93A which comprises the adapter 70A and the fitting 93A has a threaded male portion 94A which is threadedly received within the threaded port 86A. The fitting member 93A has an opposite tubular end portion 95A which is received within a counterbore 96A in housing 81A and the counterbore 96A communicates with the outer portion of the passage 90A. The main housing 81A of the adapter 70A also has a male threaded portion 97A which is particularly adapted to received a threaded cap-like member 100A therearound. A suitable elastomeric O ring seal 101A is provided between the cap-like member 100A and the outer terminal end of the threaded portion 97A to thereby provide a seal between the housing 81A and thus fitting 93A and nozzle 23A, whereby gasoline vapors flowing through the passage 29A will flow through the adapter 70A in a fluidtight manner and without leakage.

The housing 81A of adapter 70A also has a fitting member 103A extending therefrom which is provided with male threads 104A on one of its end portions which are threadedly received within the female threaded port 85A of the nozzle 23A. The fitting 103A has a frustoconical opposite end portion or surface portion 105A which is adapted to be received in a fluid-tight sealed engagement against a cooperating female frustoconocal end surface portion 106A which is provided as an integral part of the housing 81A. The frustoconical portion 105A is adjoined by an annular shoulder 107A and an internally threaded cap 110A is rotatably supported around the member 103A. The cap 110A has an annular shoulder 111A which engages the shoulder 107A and upon tightening the cap 110A forces the frustoconical surfaces 105A and 106A in rigid face-to-face sealed contact with each other.

Thus, upon threading the threaded cap 110A in position, the fitting 103A is securely fixed to the housing 81A of the adapter 70A and inasmuch as the member 103A has its threaded portion 104A threadedly received within threaded port 85A of the housing 91A fastening the threaded cap 110A in position in essence provides a rigid structural connection between the nozzle 23A and the conduit assembly 21A. The threading of the threaded cap 100A in position merely provides a connection between passage 29A and the adapter 70A inasmuch as the structural load is carried primarily by the fitting 103A and adjoining components.

It will also be appreciated, as previously suggested, that the opposite end of the conduit assembly 21A has a coupling 40A and a coupling adapter 70A which is substantially identical to the coupling adapter 70A illustrated in FIG. 9 and is used to connect the conduit assembly 21A to the dispensing pump whereby the description of such components at such opposite end will not be repeated. The connection of adapter 70A to the pump 22 is shown at 108A in FIG. 10 using a transition member 109A; and, it will be appreciated that suitable fluid connections are provided between the member 109A and the pipe 30 to the tank 31 and the pipe 33 from such tank 31.

Having described the two modifications of the conduit assembly of this invention with one being in the form of the conduit assembly 21 which does not have adapters 70 at its opposite ends and the other being in the form of conduit assembly 21A which has adapters 70A at its opposite ends, the detailed description will now proceed in connection with FIG. 11 which schematically represents two tanks designated T1 and T2 which may be interconnected by either conduit assembly 21 or 21A. The tanks T1 and T2 represent tanks which require the transfer of a volatile fluid therebetween. For example, tank T1 may be a tank provided at a refinery while tank T2 may be a mobile tank transport carried on a railroad, or on pneumatic tires on the usual roadway. Similarly, tank T1 may be considered as being a mobile transport tank and tank T2 may be considered as being an underground storage tank. In any event, the conduit assembly 21 or 21A of this invention may be utilized to convey the volatile liquid such as gasoline in one direction and gasoline vapors in an opposite direction.

The above description has proceeded using the conduit assembly either 21 or 21A to convey the liquid through the central or inner passage and vapors through the outside passage. However, it will be appreciated that the use of these passages may be reversed with connections being made at opposite ends of each conduit assembly whereby liquid could be conducted through the outer passage and vapors through inner passage, if desired.

Figure 4:
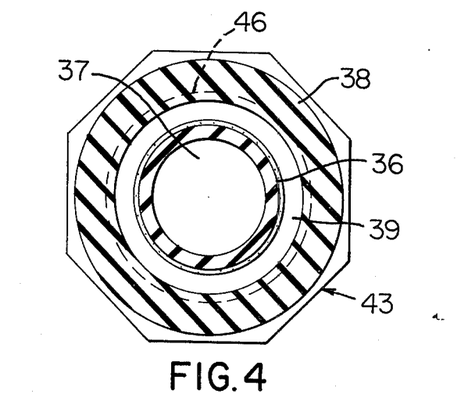
FIG. 4 is a view taken essentially on the line 4—4 of FIG. 2 showing inner and outer flexible conduits of the conduit assembly made of rubber.
Figure 5:
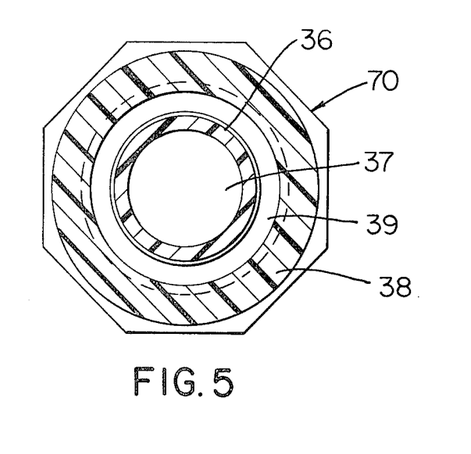
FIG. 5 is a view similar to FIG. 4 illustrating a modification in which inner and outer flexible conduits of the conduit assembly are made of a synthetic plastic material.

It should also be noted, particularly in FIG. 4, that the flexible conduits 36 and 38 are shown made of rubber; and, it will be appreciated that any suitable rubber compound which is compatible with the volatile fluid being conveyed may be used to make conduits 36 and 38 and Buna-N and neoprene rubber have been used successfully. Similarly, as shown in FIG. 5, the conduits 36 and 38 may be made of a plastic material and it will be appreciated that any suitable plastic material may be used such as polyurethane or a modified polyvinyl chloride, for example. The conduits 36A and 38A of the assembly 21A may also be made of suitable rubbers or synthetic plastic materials.

It will also be appreciated that one of the conduits of an assembly either 21 or 21A may be of rubber and the other may be of plastic. Indeed, it may be desirable to make the outer conduit of rubber and the inner conduit 36 of plastic. Further, these conduits 36, 36A, 38, and 38A may be suitably reinforced utilizing any technique known in the art.

In a gasoline dispensing application of the type shown in FIG. 1 and using either conduit assembly 21 or 21A the inner conduit is of such a construction that it is capable of withstanding a working pressure of 15–17 psig and a maximum surge pressure of 30–40 psig. The working pressure of the outer conduit 38 or 38A is usually generally of the order of 120 psig. This capability of the outer conduit is because of the construction which is required to withstand the severe abuse normally encountered at a gasoline service station. However, the internal gasoline vapor pressure which conduit 38 or 38A must withstand is generally of the order of less than one psig.

The materials used to make most of the components comprising the coupling 40–40A and adapters 70–70A are preferably metallic materials and brass is often employed for this purpose. Similarly, it will be appreciated that the clips 57 and 57A comprising the conduit assemblies 21 and 21A respectively are usually made of steel or beryllium cooper. Further, the seals 79, 79A, and 101A are usually made of Buna-N or neoprene.

The flow of volatile vapors, such as gasoline vapors, from a receiving tank (tank 24, for example) through an appropriate passage of the conduit assembly of this invention is ordinarily caused solely by the action of incompressible liquid displacing the vapors and forcing them in a direction opposite the direction of liquid flow. However, it is to be understood that suitable vacuum means may be employed to assist vapor flow.

It will also be appreciated that the flexible elastomeric conduits 36 and 38 of assembly 21 and 36A and 38A of assembly 21A are arranged free of or without supports therebetween whereby each associated assembly is of optimum simplicity.

While present exemplary embodiments of this invention, and methods of practicing the same, have been illustrated and described, it will be recognized that this invention may be otherwise variously embodied and practiced within the scope of the following claims.

What is claimed is:

1. A conduit assembly having fluid passages there for conveying a volatile liquid in one direction to a container and returning vapors of said volatile liquid from said container, said assembly comprising a flexible inner conduit defining an inner one of said fluid passages, a flexible outer conduit having an inside diameter and being disposed around said inner conduit, said conduits being relatively sized to define an outer one of said fluid passages between said conduits, a coupling having means fixing one end portion of said outer conduit thereto in sealed relation, a tubular fitting having a cylindrical outermost surface which has a diameter smaller than said inside diameter and having an end portion received within an associated end portion of said inner conduit, a fastening device fastened concentrically around said associated end portion of said inner conduit with said end portion of said fitting disposed therewithin and fixing said fitting to said inner conduit, said fastening device in its fastened condition having a maximum outside diameter which is approximately equal to the maximum outside diameter of said associated end portion of said inner conduit, and means holding said fitting and said associated end portion of said inner conduit in said coupling concentrically within said outer conduit to define a continuation of said outer passage while preventing axial movement of said fitting relative to said coupling, said coupling being adapted to be detachably fastened to a coupling adapter.

2. A conduit assembly as set forth in claim 1 and further comprising means in said coupling for detachably fastening said coupling to said adapter and wherein said adapter has first means therein adapted to receive said fitting and only flow from said inner passage therethrough and has second means therein adapted to receive only flow from said outer passage therethrough.

3. A conduit assembly as set forth in claim 2 in which said fitting has a right circular cylindrical inside surface extending the full length thereof and defining a sole longitudinal passage therethrough.

4. A conduit assembly as set forth in claim 3 in which said coupling has a first annular cutout therein and said fitting has a second annular cutout extending radially inwardly therein from said outermost surface, said means holding said fitting comprises a substantially rectangular strip bent in a substantially triangular tubular configuration having leg portions and apexes, said apexes being received within said first annular cutout and the central parts of said leg portions being received within said second annular cutout.

5. A conduit assembly as set forth in claim 1 and further comprising seal means between said coupling and said adapter, said seal means assuring said inner and outer passages are isolated from each other.

6. A conduit assembly as set forth in claim 1 in which said flexible inner conduit and said flexible outer conduit are each made primarily of an elastomeric material.

7. A conduit assembly as set forth in claim 6 in which the elastomeric material used to make at least one of said flexible conduits is rubber.

8. A conduit assembly as set forth in claim 6 in which the elastomeric material used to make at least one of said conduits is a synthetic plastic material.

9. A conduit assembly as set forth in claim 1 in which said coupling comprises a main outer housing and said fixing means comprises female threads within said outer housing and a tubular portion fixed within said housing, said outer conduit being held by said tubular portion and said female threads.

10. A gasoline dispensing assembly having fluid passages therein for conveying gasoline in one direction to a tank and returning gasoline vapors from said tank, said assembly comprising a flexible inner conduit defining an inner one of said fluid passages, a flexible outer conduit having an inside diameter and being disposed around said inner conduit, said conduits being relatively sized to define an outer one of said fluid passages between said conduits, a coupling having means fixing one end portion of said outer conduit thereto in sealed relation, a tubular fitting having a cylindrical outermost surface which has a diameter smaller than said inside diameter and having an end portion received within an associated end portion of said inner conduit, a fastening device fastened concentrically around said associated end portion of said inner conduit with said end portion of said fitting disposed therewithin and fixing said fitting to said inner conduit, said fastening device in its fastened condition having a maximum outside diameter which is approximately equal to the maximum outside diameter of said associated end portion of said inner conduit, means holding said fitting and said associated end portion of said inner conduit in said coupling concentrically within said outer conduit to define a continuation of said outer passage between said fitting and coupling while preventing axial movement of said fitting relative to said coupling, a gasoline dispensing nozzle having a coupling adapter provided therein, said coupling being detachably fastened to said adapter, and said adapter having first means therein adapted to receive said fitting and communicate only with said inner passage and having second means therein adapted to communicate only with said outer passage.

11. An assembly as set forth in claim 10 and further comprising cooperating threads in said coupling and said adapter for detachably fastening said coupling and adapter together.

12. An assembly as set forth in claim 10 in which said flexible inner conduit and said flexible outer conduit are each made primarily of an elastomeric material.

13. A conduit assembly having fluid passages therein for conveying a volatile liquid in one direction to a container and returning vapors of said volatile liquid from said container, said assembly comprising a flexible inner conduit defining an inner one of said fluid passages, a flexible outer conduit having an inside diameter and being disposed around said inner conduit, said conduits being relatively sized to define an outer one of said fluid passages between said conduits, a coupling having means fixing one end portion of said outer conduit thereto in sealed relation, a tubular fitting having a cylindrical outermost surface which has a diameter smaller than said inside diameter and having an end portion received within an associated end portion of said inner conduit, a fastening device fastened concentrically around said associated end portion of said inner conduit with said end portion of said fitting disposed therewithin and fixing said fitting to said inner conduit, said fastening device in its fastened condition having a maximum outside diameter which is approximately equal to the maximum outside diameter of said associated end portion of said inner conduit, means holding said fitting and said associated end portion of said inner conduit in said coupling concentrically within said outer conduit to define a continuation of said outer passage between said fitting and coupling while preventing axial movement of said fitting relative to said coupling, and a coupling adapter detachably fastened to said coupling and having first means therein adapted to receive said fitting and communicate only with said inner passage and having second means therein adapted to communicate only with said outer passage.

14. A conduit assembly as set forth in claim 13 in which said adapter has a first connector associated with said fitting and said inner passage and a second connector associated with said outer passage, said connectors being adapted to fasten said adapter and assembly to an associated component to be used with said assembly.

15. A conduit assembly as set forth in claim 14 in which said adapter comprises an outer housing having a plurality of internal female threads adjoining one end thereof and said coupling has an extension provided with male threads which are adapted to be threadably received within said female threads to detachably fasten said coupling and adapter together in threaded relation.

16. A conduit assembly as set forth in claim 15 in which said outer housing of said adapter has a bore therein provided with a counterbore at one end thereof, said counterbore comprising said first means and being adapted to receive a portion of said outermost cylindrical surface of said fitting therewithin.

17. A conduit assembly as set forth in claim 16 and further comprising a seal between said portion of said outermost cylindrical surface of said fitting and a right circular cylindrical surface defining said counterbore.

18. A conduit assembly as set forth in claim 16 and further comprising a chamber between said coupling and adapter, said chamber being defined upon threadedly fastening said coupling and adapter together and said chamber comprising said second means and communicating only with said outer passage.

19. A conduit assembly as set forth in claim 18 in which said adapter is defined as an integral part of a gasoline dispensing nozzle, said nozzle having a main outer housing.

20. A conduit assembly as set forth in claim 19 and further comprising a plurality of cylindrical openings in said main outer housing arranged concentrically around said bore and its adjoining counterbore, said cylindrical openings communicating at one end thereof with said chamber and comprising said second means.

21. A conduit assembly as set forth in claim 19 and further comprising a kidney-shaped opening arranged radially outwardly from said bore and counterbore and extending parallel thereto, said kidney-shaped opening communicating at one end thereof with said chamber and comprising said second means.

22. A conduit assembly as set forth in claim 16 in which said flexible inner conduit and said flexible outer conduit are each made primarily of an elastomeric material.

* * * * *

UNITED STATES PATENT OFFICE
CERTIFICATE OF CORRECTION

PATENT NO. : 3,980,112
DATED : September 14, 1976
INVENTOR(S) : Robert L. Basham It is certified that error appears in the above-identified patent and that said Letters Patent are hereby corrected as shown below:

Column 1, lines 63 and 64, delete --- means therein adapted to communicate only with the outer ---

Column 2, line 62, after the first word "gasoline" insert --- metering pump 22 of the type provided at a gasoline ---

Column 6, line 45, "outer" should be --- other ---

Column 11, line 14, "threadably" should be --- threadedly ---

Signed and Sealed this

Twenty-third Day of November 1976

[SEAL]

Attest:

RUTH C. MASON
Attesting Officer

C. MARSHALL DANN
Commissioner of Patents and Trademarks